US008242363B2

(12) United States Patent
Hou

(10) Patent No.: US 8,242,363 B2

(45) Date of Patent: Aug. 14, 2012

(54) POWER SUPPLY

(75) Inventor: Kuei-Chih Hou, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 115 days.

(21) Appl. No.: 12/777,265

(22) Filed: May 11, 2010

(65) Prior Publication Data

US 2011/0235287 A1 Sep. 29, 2011

(30) Foreign Application Priority Data

Mar. 23, 2010 (TW) ................................ 99108598 A

(51) Int. Cl.

*H01R 13/46* (2006.01)
*H02G 3/18* (2006.01)
*H02G 13/00* (2006.01)
*H02B 1/30* (2006.01)

(52) U.S. Cl. ................................ 174/60; 174/63; 174/64

(58) Field of Classification Search .................. 361/752; 174/64, 59, 60, 63, 24, 257

See application file for complete search history.

(56) References Cited

U.S. PATENT DOCUMENTS 4,205,899 A * 6/1980 King et al. .................... 385/100
4,762,583 A * 8/1988 Kaempen ...................... 156/173
5,557,068 A * 9/1996 Chung ............................ 174/59
5,831,240 A * 11/1998 Katooka et al. ............ 219/130.1
6,139,354 A * 10/2000 Broussard ...................... 439/447
6,361,382 B1 * 3/2002 Yamada et al. ............... 439/813
RE38,294 E * 11/2003 Nattel et al. .................... 174/59
7,498,513 B2 * 3/2009 Tollefson ........................ 174/50
7,658,418 B1 * 2/2010 Elbaz et al. ................ 285/153.1
7,937,818 B2 * 5/2011 Holmberg et al. .............. 29/450
2004/0222234 A1 * 11/2004 Hayduk ............................ 222/1
2005/0161246 A1 * 7/2005 Khemakhem et al. ...... 174/75 C
2007/0155231 A1 * 7/2007 Tang ............................ 439/578
2008/0053679 A1 * 3/2008 Galasso et al. .................. 174/67
2008/0089040 A1 * 4/2008 Reed et al. .................... 361/752
2008/0318471 A1 * 12/2008 Byrne et al. .................. 439/578
2009/0025977 A1 * 1/2009 Anderson et al. ............. 174/653
2009/0050344 A1 * 2/2009 Fuzetti ............................ 174/59
2009/0091897 A1 * 4/2009 Willing et al. ................ 361/752
2010/0159721 A1 * 6/2010 Dixon et al. .................... 439/98

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A power supply consists of a main body including a base and a cover. The base defines a cavity and a through hole communicating the cavity with the exterior. The cover covers the cavity. The circuit board is received in the base. The connector includes a connector body, a conductive pad, and a conductive fastener. The connector body is disposed within the cavity. The conductive pad is fixed to the connector body, connected to the circuit board, and defines a threaded hole. The conductive fastener is received in the threaded hole. The cable goes through and is connected to the conductive fastener.

5 Claims, 3 Drawing Sheets

POWER SUPPLY

BACKGROUND

1. Technical Field

The present disclosure relates to a power supply.

2. Description of Related Art

Power supplies often include an insulated housing, a circuit board, and a cable. The circuit board is received in the housing and connected to power mains for converting local power to a suitable/applicable supply for a specific load. The power cable is received in the housing and is fixedly connected, for example, soldered to the circuit board. As such, if the circuit board or the cable is damaged or when load parameters change, it is necessary to disconnect the cable from the circuit board, even if soldered, and connect a (new) cable to a (new) circuit board. This is an inconvenience.

Therefore, it is desirable to provide a power supply, which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead placed upon clearly illustrating the principles of the present power supply. Moreover, in the drawings, like reference numerals designate corresponding parts throughout the several views.

DETAILED DESCRIPTION

Embodiments of the present power supply will now be described in detail with reference to the drawings.

Figure 1:
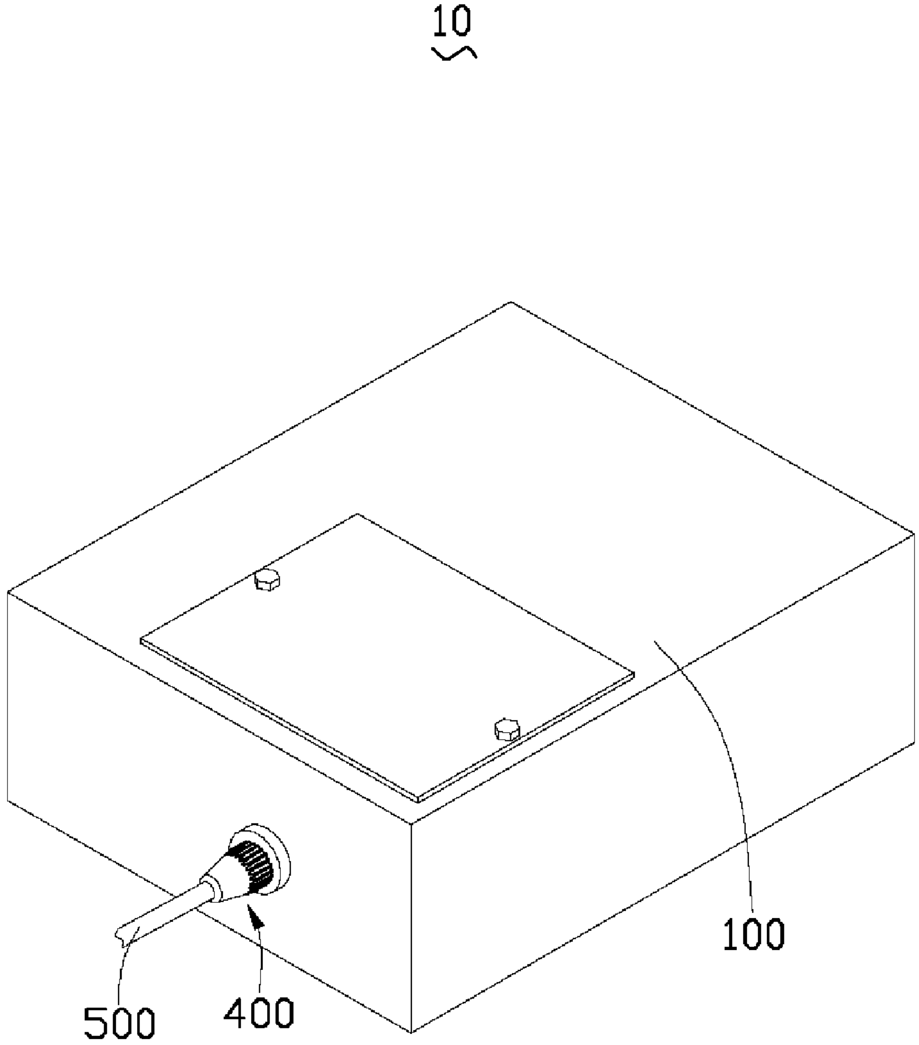
FIG. 1 is an isometric, schematic view of a power supply, according to one embodiment.
Figure 2:
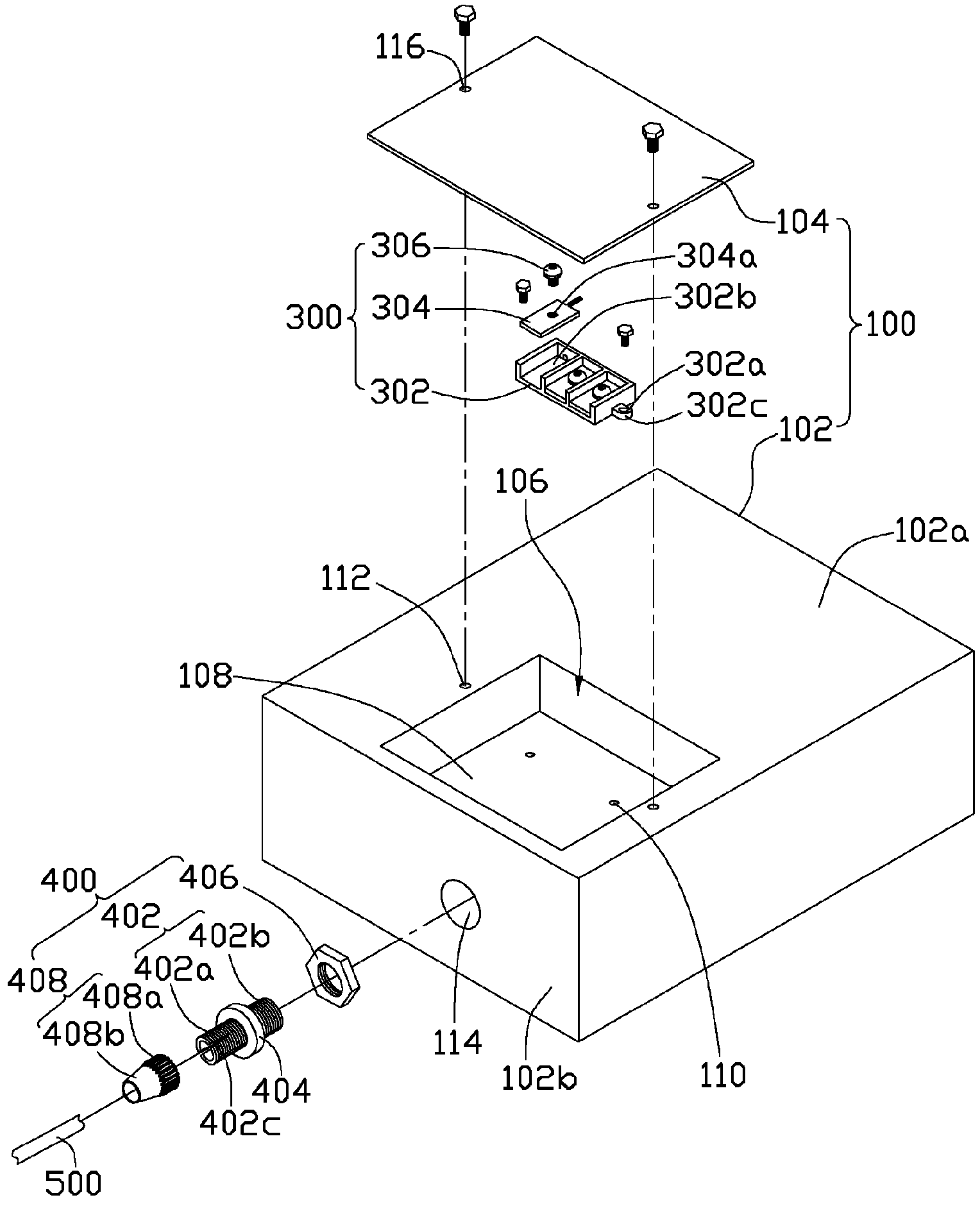
FIG. 2 is an exploded view of the power supply of FIG. 1.
Figure 3:
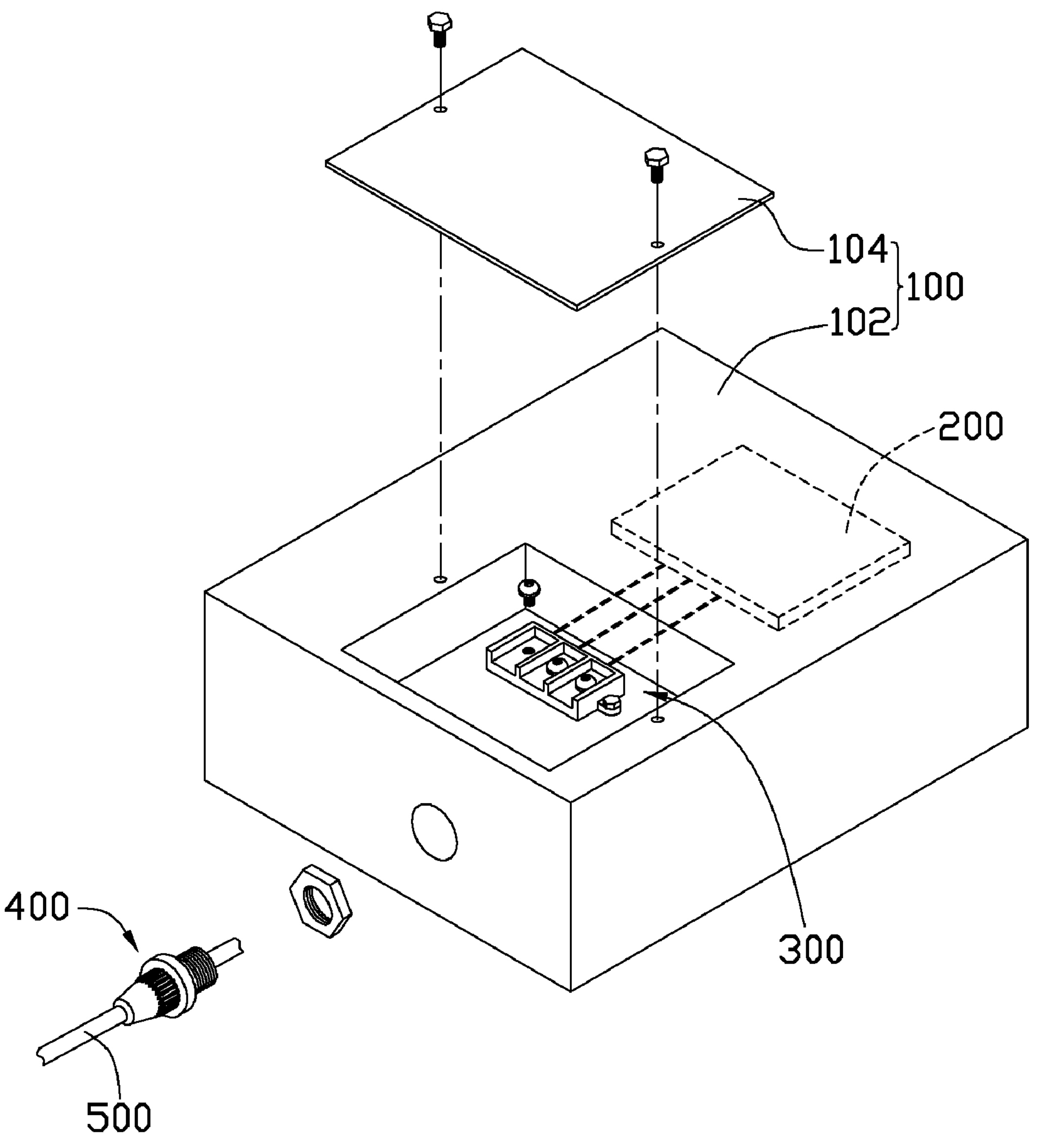
FIG. 3 is another exploded view of the power supply of FIG. 1.

Referring to FIGS. 1-3, a power supply 10, according to an embodiment, includes a main body 100, a circuit board 200, a connector 300, a cable fixing element 400, and a cable 500. The main body 100 is typically made of insulated material such as plastic and configured for housing the circuit board 200 and the connector 300.

In detail, the main body 100 includes a base 102 and a cover 104. The base 102 is generally cubic and includes an upper surface 102*a* and a front surface 102*b*. The base 102 defines a generally cubic cavity 106 in the upper surface 102*a* thereof, two first threaded blind holes 110 in a bottom surface 108 of the cavity 106, two second threaded blind holes 112 in the upper surface 102*a* at two opposite sides of the cavity 106, and a through hole 114 in the front surface 102*b* and communicating with the cavity 106. The cover 104 is substantially rectangular and larger than the opening of the cavity 106 so as to cover and seal the cavity 106. The cover 104 defines two first threaded holes 116 corresponding to the second threaded blind holes 112. The cover 104 is fixed to the base 102 by two fasteners (not labeled) passing through the first threaded holes 116 and into the second threaded blind holes 112.

It is noteworthy that the configuration of the main body 100 is not limited to this embodiment. In other embodiments, the cover 104 can be fixed to the base 102 via other means, such as structural engagement or adhesive. As such, the first threaded holes 116 and the second threaded blind holes 112 can be omitted. The cavity 106 and the through hole 114 can be defined in other surfaces of the base 102, provided that the through hole 114 communicates the cavity 106 with the outside of the base 102. In addition, the base 102, the cover 104, and the cavity 106 can be other geometrical shapes.

The circuit board 200 is received the cavity 106 or other section of the base 102, in this embodiment, at the rear of the cavity 106.

The connector 300 includes a connector body 302, three conductive pads 304, and three conductive fasteners 306. The connector body 302 is generally a cubic insulated block with two ears 302*c* extending from opposite ends. Each ear 302*c* defines a second threaded hole 302*a* corresponding to the first threaded blind holes 110. The connector body 302 is fixed to the base 102 by two fasteners (not labeled) passing through the second threaded holes 302*a* and into the first threaded blind holes 110. The connector body 302 defines three laterally arranged slots 302*b* in a top surface (not labeled) thereof. The conductive pads 304 are shaped corresponding to the slots 302*b* respectively, and are accordingly received therein and electrically connected to the circuit board 200. Each conductive pad 302*b* defines a connecting threaded hole 304*a*.

In other alternative embodiments, the connector body 302 can be fixed to the base 102 structurally, by adhesive, or other means. As such, the ears, the second threaded holes 302*a*, and the first threaded blind holes 100 can be omitted. One, two, or more than three slots 302*b*, conductive pads 304, and conductive fasteners 306 can be utilized depending on requirements. Connector body 302 and slots 302*b* can be realigned or repositioned as needed in other embodiments, and conductive pads 304 can be fixed to the connector body 302 via alternative means as well.

The cable fixing element 400 includes a hollow barrel 402, a retaining ring 404, a threaded retainer 406, and a compressing threaded retainer 408. The hollow barrel 402 has a first end 402*a* and a second end 402*b*, and diametrically defines two slots 402*c* at the first end 402*a* along the axial direction thereof. The outer diameter of the hollow barrel 402 is substantially equal to the diameter of the through hole 114. The inner diameter of the hollow barrel 402 is larger than the diameter of the cable 500. The retaining ring 404 is fixed to the hollow barrel 42, generally at the middle thereof. The distance between the retaining ring 404 and the second end 402*b* is longer than the through hole 114. The compressing threaded retainer 408 has a tapered configuration and tapers from a large end 408*a* to a small end 408*b*. The inner diameter of the compressing threaded retainer 408 at the large end 408*a* is substantially equal to the outer diameter of the hollow barrel 402 and tapers towards the small end 408*b*.

In assembly, the cable 500 sequentially passes through the compressing threaded retainer 408 from the small end 408*b* to the large end 408*b*, the hollow barrel 402 from the first end 402*a* to the second end 402*b*, the though hole 114, and the threaded retainer 406. As such, the cable 500 is received in the base 102.

The second end 402*b* of the hollow barrel 402 is received in the through hole 114 until the retaining ring 404 abuts the front surface 102*b*. The threaded retainer 406 passes through the second end 402*b* of the hollow barrel 402 until abutting the base 102. As such, the hollow barrel 402 is fixed to the base via the retaining ring 404 and the threaded retainer 406.

The cable 500 is received in the hollow barrel 402. Conductive cores of wires (not shown) of the cable 500 winds on the conductive fasteners 306 respectively. The conductive fasteners 306 are received in the connecting threaded holes 304*a* respectively. As such, the cable 500 is connected to the connector 300 and thus to the circuit board 200.

The compressing threaded retainer 408 passes through the first end 402*a* of the hollow barrel 402. Since the first end 402*a* of the hollow barrel 402 is slotted and the inner diameter of the compressing threaded retainer 408 tapers towards the small end 408, the first end 402*a* of the hollow barrel 402 deforms and the inner diameter thereof gradually decreases from force of the compressing threaded retainer 408. As such, the cable 500 is fixed by the cable fixing element 400 and attached to the base 102.

When replacement of the circuit board 200 or the cable 500 is needed, the conductive fasteners 306 are withdrawn from the connecting threaded holes 304*a* and the cores of the wires of the cable 500 unwound from the conductive fasteners 306 for replacement.

It should be noted that the slots 402*c* are not limited to two in number, but can be one or more than two. The hollow barrel 402 can be fixed to the base 102 via other means such as structural engagement or adhesive, in which case the retaining ring 404 and the threaded retainer 406 can be omitted. Also, provided that the cable 500 can be fittingly inserted through the through hole 114, the cable fixing element 400 can be omitted.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A power supply comprising:

a main body comprising a base and a cover, the base defining a cavity and a through hole communicating the cavity with the exterior, the cover covering the cavity;

a circuit board received in the base;

a connector comprising a connector body, a conductive pad, and a conductive fastener, the connector body disposed within the cavity, the conductive pad fixed to the connector body, connected to the circuit board and defining a threaded hole, and the conductive fastener received in the threaded hole;

a cable passing through the through hole and connected to the conductive fastener; and a cable fixing element comprising:

a hollow barrel comprising a first end, the first end defining at least one slot in a sidewall of the hollow barrel along an axial direction of the hollow barrel, the hollow barrel passing through the through hole with the first end exposed to the exterior, the cable passing through the hollow barrel; and a compressing threaded retainer comprising a large end and a small end, the inner diameter of the compressing threaded retainer at the large end substantially equal to the outer diameter of the hollow barrel and tapering towards the small end; the large end of the compressing threaded retainer receiving and compressing the first end of the hollow barrel such that the first end deforms and the inner diameter of the first end gradually decreases due to the compression of the compressing threaded retainer to fix the cable therein.

2. The power supply of claim 1, wherein the cable fixing element further comprises:

a retaining ring fixed to the hollow barrel, exposed to the exterior, and abutting the base; and a threaded retainer receiving a second end of the hollow barrel opposite to the first end and abutting the base.

3. The power supply of claim 2, wherein the retaining ring is fixed to the middle of the hollow barrel.

4. The power supply of claim 3, wherein the threaded retainer is positioned in the cavity and the retaining ring is positioned outside the cavity.

5. The power supply of claim 1, wherein the base defines two threaded blind holes in a bottom surface of the cavity; the connector body comprises two ears extending from opposite ends, each ear defines a threaded hole spatially corresponding to a respective one of the two threaded blind holes, the connector body is fixed to the base by two fasteners passing through the threaded holes and into the threaded blind holes.

* * * * *